United States Patent
Keagy

(10) Patent No.: US 7,170,976 B1
(45) Date of Patent: Jan. 30, 2007

(54) SYSTEM AND METHOD FOR COMMUNICATING TEXT TELETYPE (TTY) INFORMATION IN A COMMUNICATION NETWORK

(75) Inventor: Scott C. Keagy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 338 days.

(21) Appl. No.: 10/322,076

(22) Filed: Dec. 17, 2002

(51) Int. Cl.
*H04M 11/06* (2006.01)

(52) U.S. Cl. ............... 379/52; 379/88.13; 379/88.16; 370/352; 455/412.1

(58) Field of Classification Search ............... 379/52, 379/88.17; 341/91; 360/72.3; 372/52
See application file for complete search history.

(56) References Cited

U.S. PATENT DOCUMENTS

| | | | |
|---|---|---|---|
| 5,195,000 A * | 3/1993 | Suzuki ................. | 360/72.3 |
| 6,351,495 B1 * | 2/2002 | Tarraf ................. | 375/259 |
| 6,501,779 B1 * | 12/2002 | McLaughlin et al. ....... | 372/52 |
| 6,545,616 B1 * | 4/2003 | Haimi-Cohen .............. | 341/91 |
| 6,546,082 B1 * | 4/2003 | Alcendor et al. ............ | 379/52 |
| 2004/0198323 A1 * | 10/2004 | Himanen et al. ........... | 455/412.1 |

OTHER PUBLICATIONS http://www.intel.com/network/csp/products/3940web.htm, "Intel Telecom Products: DM IP Series Release 5.1," 7 pages, printed Nov. 14, 2002.
http://www.tmcnet.com.articles/itmag/2ndQuater/centerstage001.htm, "Internet Telephony Center Stage: Second Quater 1998," 4 pages, printed Nov. 14, 2002.
http://resource.intel.com/telecom/support/Documentation/learnabout/Documents/IPLink/iptugunx/1179-03-14.html, "Internal Components," 3 pages, printed Nov. 14, 2002.

* cited by examiner

Primary Examiner—Gerald Gauthier
(74) Attorney, Agent, or Firm—Baker Botts L.L.P.

(57) ABSTRACT

A method includes receiving signals comprising at least one of voice information and text teletype information. The method also includes determining whether at least some of the signals contain text teletype information. The method further includes coding any of the signals containing text teletype information using a text teletype coder. In addition, the method includes coding any of the signals containing voice information using a voice coder.

32 Claims, 3 Drawing Sheets

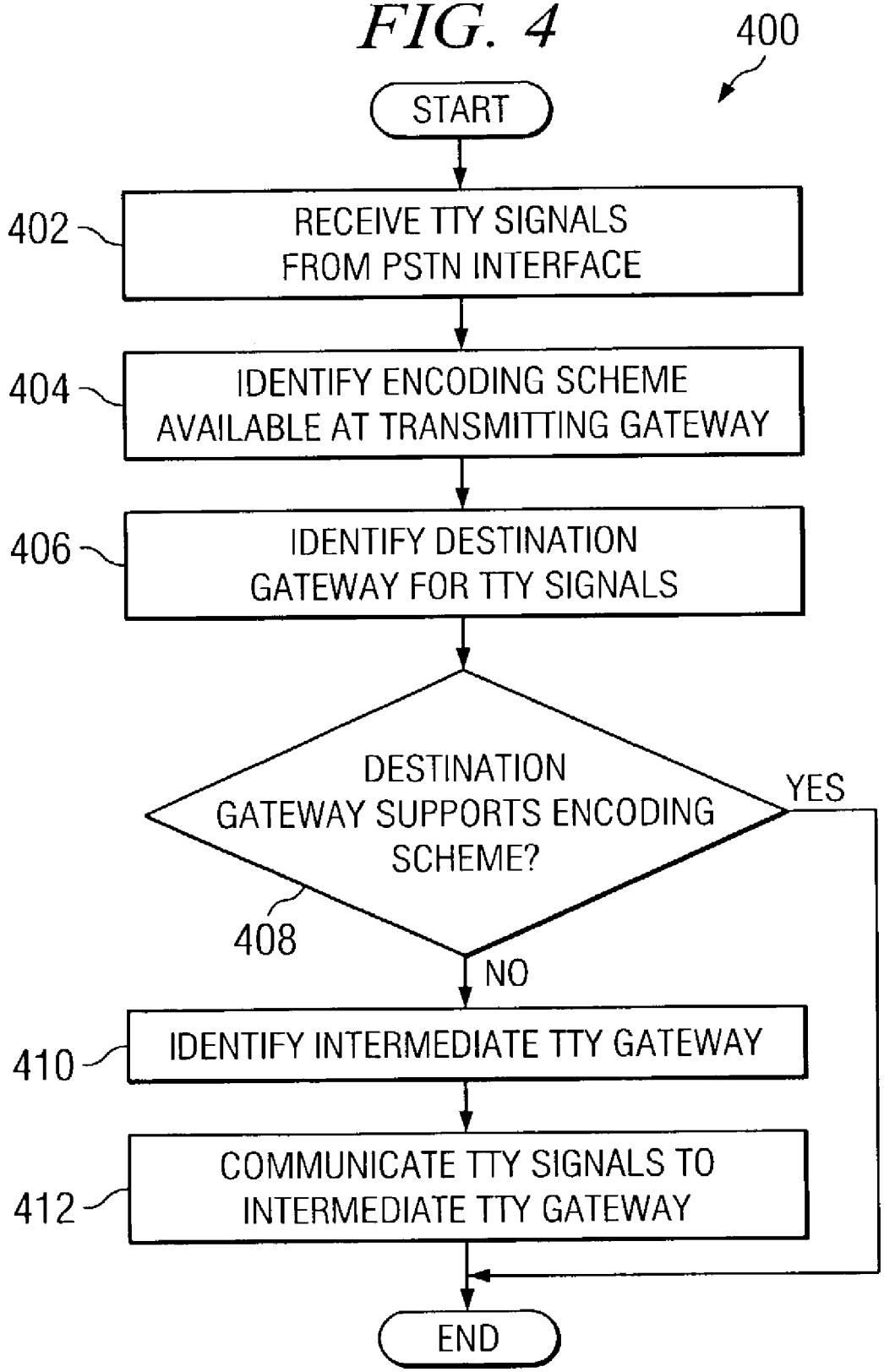

SYSTEM AND METHOD FOR COMMUNICATING TEXT TELETYPE (TTY) INFORMATION IN A COMMUNICATION NETWORK

TECHNICAL FIELD

This disclosure relates generally to communication systems, and more particularly to a system and method for communicating text teletype (TTY) information in a communication network.

BACKGROUND

Text teletype (TTY) devices are often used by people with hearing disabilities to communicate over a network. A typical TTY device has a keyboard, and keystrokes by a user are converted into electrical signals that are sent over the network. The network used to transport the electrical signals may include a packet-based communication network. A typical packet network can support communication sessions between two or more participants. For example, the network could support a voice telephone call by transporting Internet Protocol (IP) packets between a calling party and a called party. In general, codecs are used to process voice signals for transport over the packet network.

SUMMARY

This disclosure describes a system and method for communicating text teletype (TTY) information in a communication network.

In one embodiment, a method includes receiving signals comprising at least one of voice information and text teletype information. The method also includes determining whether at least some of the signals contain text teletype information. The method further includes coding any of the signals containing text teletype information using a text teletype coder. In addition, the method includes coding any of the signals containing voice information using a voice coder.

In another embodiment, a method includes receiving signals comprising text teletype information. The method also includes encoding the text teletype information using a text teletype encoding scheme. The method further includes identifying a destination associated with the text teletype information and determining whether a gateway associated with the destination supports the text teletype encoding scheme. In addition, the method includes communicating the text teletype information to the gateway when the gateway supports the text teletype encoding scheme. In a particular embodiment, the text teletype encoding scheme comprises a first text teletype encoding scheme, and the method further includes identifying a second text teletype encoding scheme supported by the gateway, identifying one or more text teletype translators that support both the first and second text teletype encoding schemes, and communicating the text teletype information to at least one of the one or more identified text teletype translators for delivery to the gateway when the gateway does not support the first text teletype encoding scheme.

One or more technical features may be present according to various embodiments of this disclosure. Particular embodiments of this disclosure may exhibit none, some, or all of the following features depending on the implementation. For example, in one embodiment, a gateway is provided that can detect whether incoming signals represent voice signals or TTY signals. The gateway can then provide the voice signals to a voice coder and the TTY signals to a TTY coder. Because TTY signals may not be effectively coded by a low-bit voice codec because voice codecs are often optimized for human voice signals, this allows the incoming signals to be processed by a more suitable coder.

Moreover, a gateway transmitting TTY signals could communicate with a gateway receiving the TTY signals before the TTY signals are exchanged. The transmitting gateway can identify the TTY encoding scheme or schemes that are supported by the receiving gateway. If the receiving gateway is unable to process TTY signals using an encoding scheme supported by the transmitting gateway, the transmitting gateway could select an intermediate TTY translator. The TTY translator can translate the TTY signals from an encoding scheme used by the transmitting gateway to another encoding scheme used by the receiving gateway. This may help to increase the likelihood that TTY signals from one end of a communication session can be understood at the other end of the session. As a particular example, this may facilitate TTY communications between different countries, which often use different TTY encoding schemes. Further, the use of one or more TTY translators in a packet network can help to simplify the network topology when the translation functionality of TTY translators is needed in the network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 4 illustrates an example method for negotiation between gateways in a communication network.

DETAILED DESCRIPTION OF EXAMPLE EMBODIMENTS

Figure 1:
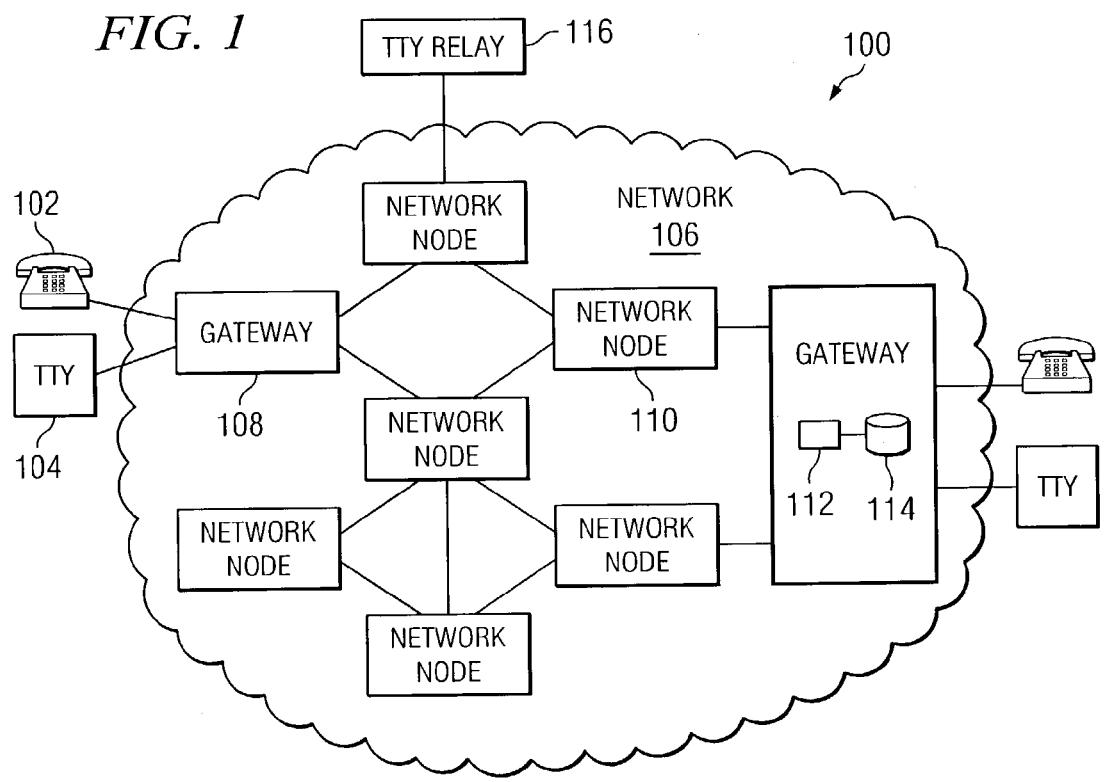
FIG. 1 illustrates an example communication system.

FIG. 1 illustrates an example communication system 100. In the illustrated embodiment, system 100 includes voice devices 102, text teletype (TTY) devices 104, and a network 106. Other embodiments of system 100 may be used without departing from the scope of this disclosure.

In one aspect of operation, network 106 includes one or more gateways 108. Gateways 108 allow voice devices 102 and TTY devices 104 to establish communication sessions in system 100, such as by transporting information between two or more devices 102, 104. During a communication session, gateway 108 may receive incoming signals from a voice device 102 and/or a TTY device 104. Gateway 108 detects whether an incoming signal represents a voice signal or a TTY signal. Gateway 108 then passes the voice signal to a voice coder and the TTY signal to a TTY coder. This allows the incoming signals to be processed by a suitable coder.

In the illustrated embodiment, voice devices 102 are coupled to network 106. In this document, the term "couple" refers to any direct or indirect physical, logical, virtual, or other types of communication between two or more components, whether or not those components are in physical contact with one another. Voice device 102 may include any communication device for generating voice data, storing voice data, sending voice data to network 106, receiving voice data from network 106, and/or converting voice data to audible sounds. For example, voice device 102 could represent a wireline telephone, a wireless telephone, a voice-capable personal computer, or a voice-capable personal digital assistant.

In the illustrated embodiment, TTY devices 104 are coupled to network 106. TTY devices 104 could also be coupled to voice devices 102, which are then coupled to network 106. TTY devices 104 communicate text information over network 106. For example, TTY devices 104 may be used by people with hearing disabilities to communicate over network 106. TTY device 104 may include any hardware, software, firmware, or combination thereof for generating, communicating, receiving, and/or displaying text information. In one embodiment, TTY device 104 includes a keyboard or other input device and a display or other output device.

Network 106 facilitates communication between components coupled to network 106. For example, network 106 may communicate packets containing voice data or TTY data between network addresses. In this document, the term "packet" refers to IP packets, frame relay frames, Asynchronous Transfer Mode (ATM) cells, or any other suitable segments of information. Network 106 may include one or more local area networks (LANs), metropolitan area networks (MANs), wide area networks (WANs), all or a portion of a global network such as the Internet, or any other communication system or systems at one or more locations. Network 106 may also operate according to any appropriate type of protocol or protocols, such as Ethernet, IP, X.25, frame relay, or any other packet data protocol. Network 106 may further support the conveyance of non-voice and non-TTY packets between voice devices 102, TTY devices 104, and/or other devices.

Figure 2:
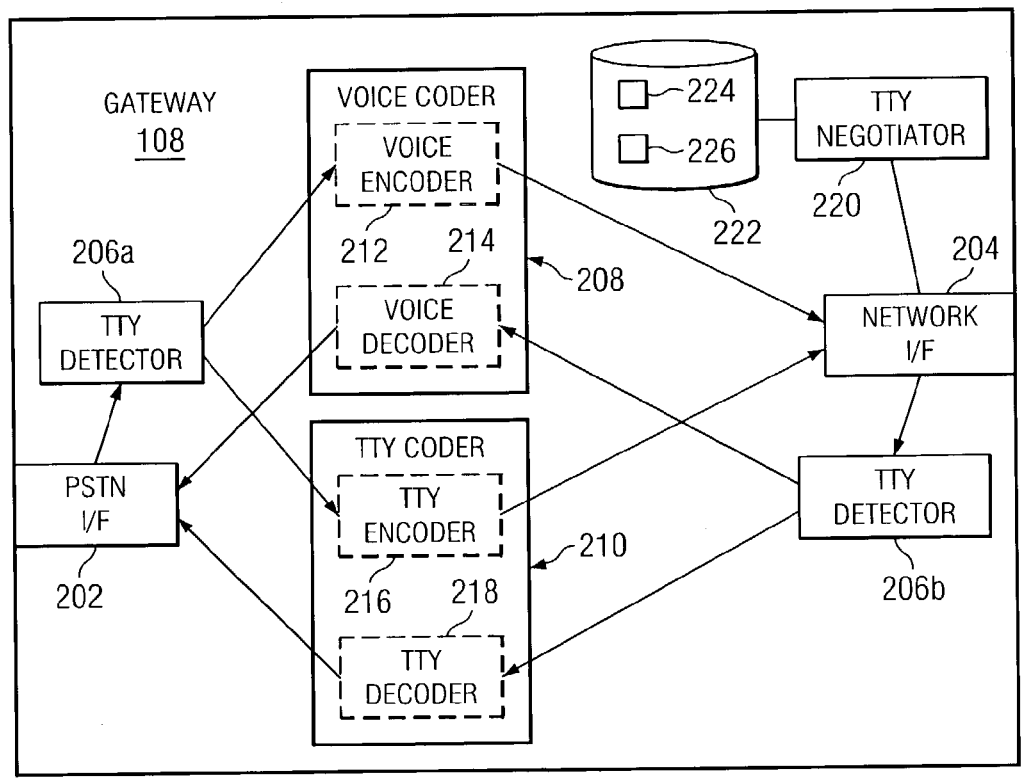
FIG. 2 illustrates an example gateway.

In the illustrated example, network 106 includes gateways 108 and network nodes 110. Gateways 108 facilitate communication by voice devices 102 and/or TTY devices 104 over network 106. For example, gateways 108 may receive information from voice devices 102 and/or TTY devices 104, packetize the information, and communicate the packets over network 106. Gateways 108 may also receive packets over network 106, depacketize the information, and communicate voice signals to voice devices 102 and/or TTY signals to TTY devices 104. Gateways 108 may further communicate with one another to establish communication sessions between voice devices 102 and/or TTY devices 104. Gateway 108 may represent a switch, router, bridge, voice gateway, call manager, transceiver, hub, and/or any other type of device for conveying data packets. Gateway 108 may include any hardware, software, firmware, or combination thereof for supporting the transport of voice and TTY information over network 106. Gateway 108 may, for example, include one or more processors 112 and one or more memories 114. One example of a gateway 108 is shown in FIG. 2, which is described below.

Network nodes 110 facilitate the communication of packets through network 106. Network node 110 may represent a switch, router, bridge, voice gateway, call manager, transceiver, hub, and/or any other type of device for conveying data packets. Any suitable number of network nodes 110 and arrangement of network nodes 110 may be used in network 106.

In one aspect of operation, gateway 108 may receive incoming signals during a communication session. The incoming signals could originate at a voice device 102 and/or a TTY device 104 coupled to gateway 108 or coupled to another gateway 108 in system 100. Gateway 108 examines the incoming signals and determines whether the signals contain information from a voice device 102 or from a TTY device 104. If voice information is present, gateway 108 routes the voice information to a voice coder, such as a low-bit voice codec. If TTY information is present, gateway 108 routes the TTY information to a TTY coder, such as an encoder or decoder. By routing voice information to a voice coder and TTY information to a TTY coder, gateway 108 may more effectively process the incoming signals. For example, standard low-bit voice codecs may be unable to code TTY information with sufficient quality to enable accurate decoding at a receiving gateway 108 because the voice codecs often employ lossy compression schemes optimized for processing human speech. Also, encoding TTY signals with low bit-rate voice codecs may be a less efficient mechanism for transmitting TTY information than simply communicating a representation of the TTY information. In this specification, the term "coder" refers to one or more encoders and/or one or more decoders operable to encode and/or decode information. Also, in this specification, the term "coding" refers to encoding and/or decoding information.

Gateway 108 could use any suitable mechanism for identifying TTY information in the incoming signals. For example, a TTY device 104 could generate a start signal when a user initiates communication with the TTY device 104. As a particular example, the user could press the space bar on a keyboard of the TTY device 104 multiple times, and the signal pattern generated by TTY device 104 could represent the start signal. When gateway 108 detects the start signal, gateway 108 recognizes that at least some of the signals during a communication session represent TTY information.

In one embodiment, both voice and TTY information could be received by gateway 108 during the same communication session. For example, this may occur when a telephone call involves two users at one end of the call, one user using voice device 102 and another user using TTY device 104. In this embodiment, the frequency patterns of the voice signals may differ from the frequency patterns of the TTY signals. Gateway 108 may monitor a portion of the incoming signals and determine whether the frequency pattern looks like a voice signal or a TTY signal. Gateway 108 then uses a voice coder or a TTY coder to encode or decode that portion of the incoming signals.

In a particular embodiment, gateway 108 could be programmed to always use the voice coder and/or to always use the TTY coder for particular communication sessions. As an example, businesses often advertise one telephone number for voice calls and another telephone number for calls involving a TTY device 104. In this example, gateway 108 could be programmed so that all calls to the voice telephone number are processed by the voice coder, and the TTY coder is not used during those calls. Similarly, gateway 108 could be programmed so that all calls to the TTY telephone number are processed by the TTY coder, and the voice coder is not used during those calls.

In another aspect of operation, gateways 108 each support one or more TTY encoding schemes. For example, each gateway 108 could support one or more Baudot schemes (such as the United States of America Baudot, Australian Baudot, and United Kingdom Baudot schemes), one or more Dual Tone Multi-Frequency (DTMF) schemes (such as Denmark DTMF, Norway DTMF, and Sweden DTMF schemes), one or more European Deaf Telephone (EDT) schemes (such as Austria EDT, Germany EDT, and Switzerland EDT schemes), the International Telecommunication Union (ITU) V.21 scheme, and/or any other or additional scheme or schemes. Gateways 108 could support at least one common TTY encoding scheme, or gateways 108 could use different TTY encoding schemes to process TTY signals. As an example, one gateway 108 could only support the Baudot scheme while another only supports the V.21 scheme.

When a communication session involving two or more TTY devices 104 is being established, gateways 108 serving the TTY devices 104 may communicate with one another and determine if a common TTY encoding scheme is used by the gateways 108. If so, gateways 108 can communicate TTY signals to each other using the common encoding scheme. Otherwise, one or more of the gateways 108 may identify a suitable intermediate TTY translator 116 in system 100. TTY translator 116 represents a device in system 100 that can communicate with gateways 108 using different TTY encoding schemes. A gateway 108 can communicate TTY signals to TTY translator 116 using one encoding scheme, and TTY translator 116 can convert the TTY signals to another encoding scheme understood by another gateway 108. In this way, gateways 108 can communicate and negotiate the TTY encoding scheme or schemes to be used during a communication session.

This describes one mechanism that gateways 108 may use to identify a common encoding scheme and determine whether one or more TTY translators 116 are needed. Other mechanisms could also be used. For example, gateways 108 could negotiate TTY translator capabilities as part of a media capabilities negotiation, which may be embedded within a call control protocol. For example, the media negotiations could occur within the framework defined by the Session Description Protocol, which forms part of the Session Initiation Protocol (SIP). An another example, the media negotiations could occur within the ITU H.323 framework.

Although FIG. 1 illustrates one example of a communication system 100, various changes may be made to system 100. For example, any suitable number of voice devices 102 and/or TTY devices 104 could be coupled to each gateway 108. Also, network 106 could include any suitable number and arrangement of gateways 108 and/or network nodes 110. Further, multiple TTY translators 116 could be used in system 100 and coupled to network 106 at any suitable location or locations. Beyond that, FIG. 1 illustrates one example operational environment of gateway 108. The functionality of gateway 108 could be used in any other suitable operational environment. In addition, the functionality of TTY translator 116 could be incorporated into one or more gateways 108.

FIG. 2 illustrates an example gateway 108. In the illustrated example, gateway 108 includes a public switched telephone network (PSTN) interface 202, a network interface 204, one or more TTY detectors 206, a voice coder 208, and a TTY coder 210. Other embodiments of gateway 108 could be used without departing from the scope of this disclosure.

PSTN interface 202 is coupled to a TTY detector 206, voice coder 208, and TTY coder 210. PSTN interface 202 facilitates communication with one or more voice devices 102 and/or TTY devices 104. For example, PSTN interface 202 may receive voice and TTY signals from one or more voice devices 102 and TTY devices 104, and PSTN interface 202 forwards the signals to TTY detector 206. PSTN interface 202 may also receive voice signals and TTY signals from voice coder 208 and TTY coder 210, and PSTN interface 202 communicates the signals to one or more voice devices 102 and TTY devices 104. PSTN interface 202 may include any hardware, software, firmware, or combination thereof for communicating with voice devices 102 and/or TTY devices 104. PSTN interface 202 may, for example, include one or more Plain Old Telephone Service (POTS) interfaces.

Network interface 204 is coupled to a TTY detector 206, voice coder 208, and TTY coder 210. Network interface 204 facilitates communication over network 106. For example, network interface 204 may receive digitized voice and TTY signals from voice coder 208 and TTY coder 210, and network interface 204 packetizes and communicates the signals over network 106. Network interface 204 may also receive packets containing digitized voice and TTY signals from network 106, and network interface 204 depacketizes and forwards the signals to TTY detector 206. Network interface 204 may include any hardware, software, firmware, or combination thereof for communicating over network 106. Network interface 204 may, for example, include one or more Ethernet interfaces.

TTY detectors 206 are coupled to voice coder 208, TTY coder 210, and an interface 202, 204. TTY detector 206 detects whether at least a portion of incoming signals represents voice information or TTY information. For example, TTY detector 206a could receive voice and TTY signals from one or more voice devices 102 and/or TTY devices 104 over PSTN interface 202. TTY detector 206a could determine whether all or a portion of the incoming signals represents voice information from a voice device 102 or TTY information from a TTY device 104. If voice information is present, the voice signal is removed from any TTY signal and is forwarded to voice coder 208. If TTY information is present, the TTY signal is removed from any voice signal and is forwarded to TTY coder 210.

Similarly, TTY detector 206b could receive a packet containing voice or TTY information from network 106, and TTY detector 206b determines whether to forward the information to voice coder 208 or TTY coder 210. In one embodiment, gateways 108 communicate voice information "in-band" within an audio stream during a communication session, and gateways 108 communicate TTY information "out-of-band" separate from the audio stream during the communication session. In this embodiment, TTY detector 206b could determine whether the packet was received in-band or out-of-band. Information in an in-band packet is sent to voice coder 208, and information in an out-of-band packet is sent to TTY coder 210.

TTY detector 206 may include any hardware, software, firmware, or combination thereof for identifying and distinguishing voice and TTY information. For example, TTY detector 206 could include one or more digital signal processors (DSPs). Although FIG. 2 illustrates two separate TTY detectors 206, one TTY detector 206 or more than two TTY detectors 206 could be used in gateway 108.

Voice coder 208 is coupled to TTY detectors 206. Voice coder 208 facilitates the encoding and decoding of voice information in gateway 108. For example, voice coder 208 could represent one or more voice codecs. As particular examples, voice coder 208 could represent one or more low-bit voice codecs, such as ITU G.729, G.729a, and G.723.1 voice codecs. In the illustrated example, voice coder 208 includes one or more voice encoders 212 and one or more voice decoders 214. Voice encoders 212 operate to encode voice signals using one or more encoding schemes, and voice decoders operate to decode voice signals that have been encoded using one or more encoding schemes. The encoding scheme or schemes supported by voice encoders 212 may or may not be the same encoding scheme or schemes supported by voice decoders 214. Voice coder 208 may include any hardware, software, firmware, or combination thereof for encoding and/or decoding voice information. Although FIG. 2 shows voice coder 208 as including both a voice encoder 212 and a voice decoder 214, voice coder 208 could include one or the other.

TTY coder 210 is coupled to TTY detectors 206. TTY coder 210 facilitates the encoding and decoding of TTY information in gateway 108. For example, TTY coder 210 could represent coders that support the Baudot, V.21, and/or other TTY encoding schemes. In the illustrated example, TTY coder 210 includes one or more TTY encoders 216 and one or more TTY decoders 218. TTY encoders 216 operate to encode TTY signals using one or more encoding schemes, and TTY decoders operate to decode TTY signals that have been encoded using one or more encoding schemes. The encoding scheme or schemes supported by TTY encoders 216 may or may not be the same encoding scheme or schemes supported by TTY decoders 218. TTY coder 210 may include any hardware, software, firmware, or combination thereof for encoding and/or decoding TTY information. Although FIG. 2 shows TTY coder 210 as including both a TTY encoder 216 and a TTY decoder 218, TTY coder 210 could include one or the other.

TTY negotiator 220 is coupled to network interface 204. TTY negotiator 220 in one gateway 108 communicates with TTY negotiator 220 in another gateway 108. TTY negotiators 220 determine whether both gateways 108 support a common TTY encoding scheme. For example, TTY negotiators 220 may determine whether any encoding scheme used by TTY coder 210 in one gateway 108 is also supported in the other gateway 108. If a common encoding scheme is supported in both gateways 108, the common scheme is used by both gateways 108 during the communication session. Otherwise, one or both TTY negotiators 220 attempt to identify a TTY translator 116 to be used during the communication session. The TTY translator 116 acts as an intermediary and translates between the different encoding schemes used by the gateways 108.

While TTY negotiators 220 have been described as communicating with one another to identify a common TTY encoding scheme, other techniques could be used. For example, a memory 222 may be coupled to a TTY negotiator 220. Memory 222 could include a table 224 identifying the various gateways 108 in system 100 and the encoding scheme or schemes supported by those gateways 108. Memory 222 may also include a table 226 identifying the various intermediate TTY translators 116 in system 100 and the encoding schemes supported by those intermediate TTY translators 116. When gateway 108 receives incoming TTY signals from a TTY device 104 coupled to gateway 108, TTY negotiator 220 identifies the destination of the TTY signals. TTY negotiator 220 also identifies the gateway 108 serving the destination. TTY negotiator 220 can then access table 224 and determine whether the gateway 108 serving the destination supports an encoding scheme used by the gateway 108 in which TTY negotiator 220 resides. If not, TTY negotiator 220 accesses table 226 and determines whether one or more intermediate TTY translators 116 support both of the encoding schemes used by the gateways 108. If TTY negotiator 220 identifies at least one intermediate TTY translator 116, the gateways 108 exchange TTY information through the identified TTY translator 116. In this embodiment, a single TTY translator 116 could be used, or two or more TTY translators 116 in series could be used.

Although FIG. 2 illustrates one example of a gateway 108, various changes may be made to FIG. 2. For example, the functional division of gateway 108 is for illustration only. Various components can be omitted or combined and additional components can be added according to particular needs. Also, gateway 108 could include multiple voice encoders 212, voice decoders 214, TTY encoders 216, and/or TTY decoders 218. Further, TTY negotiator 220 need not be included in gateway 108. In addition, other embodiments of gateway 108 could be used in system 100.

Figure 3:
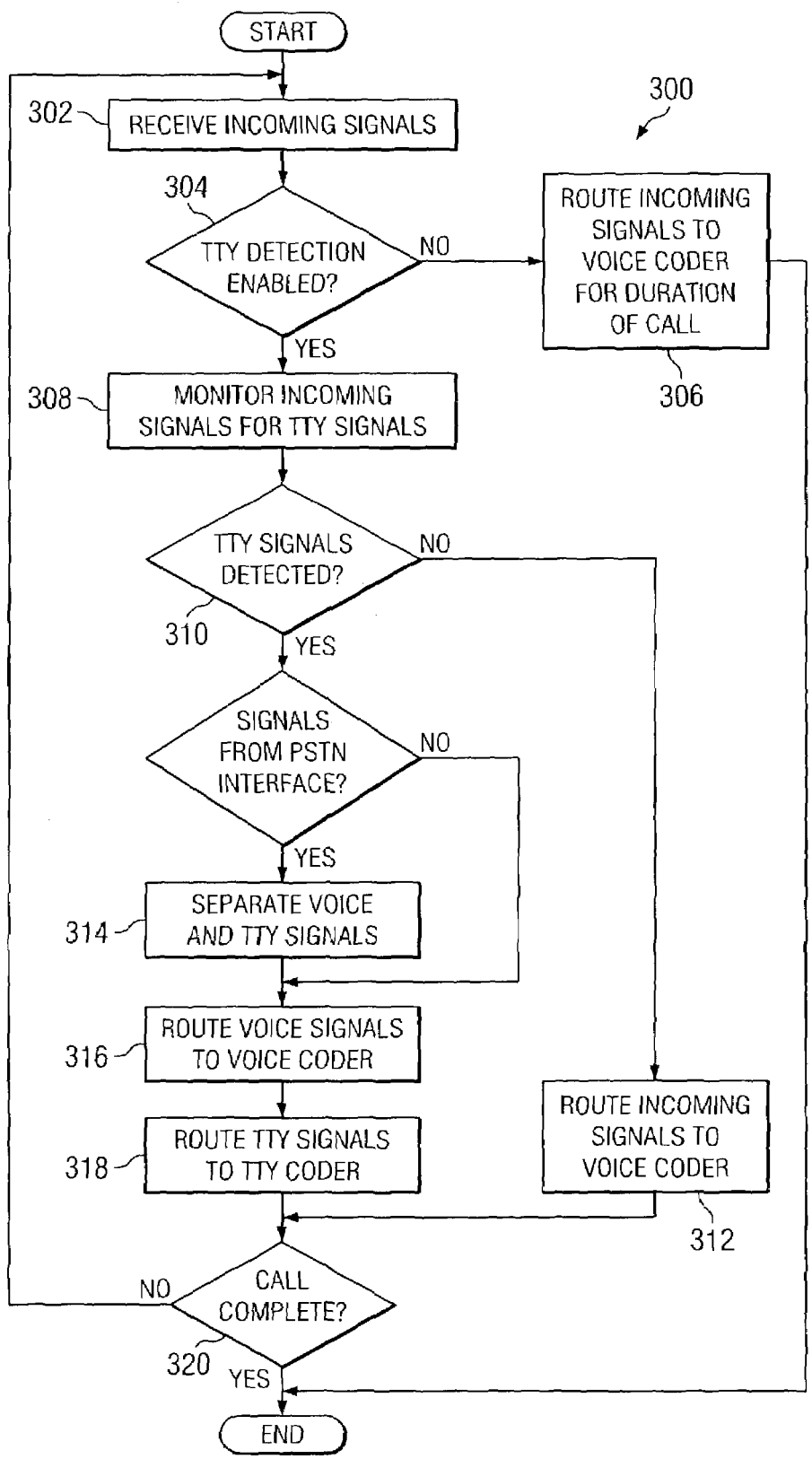
FIG. 3 illustrates an example method for communicating text teletype information in a communication network.

FIG. 3 illustrates an example method 300 for communicating text teletype information in a communication network. While method 300 may be described with respect to gateway 108 of FIG. 2 operating in the system 100 of FIG. 1, method 300 could be used by any suitable device operating in any suitable system.

Gateway 108 receives incoming signals at step 302. This may include, for example, gateway 108 receiving voice and/or TTY information over PSTN interface 202. This may also include gateway 108 receiving packets containing voice and/or TTY information over network interface 204.

Gateway 108 determines whether detection of TTY information is enabled for the current communication session at step 304. This may include, for example, gateway 108 determining whether a telephone number associated with the communication session supports only voice or only TTY communications. If TTY detection is not enabled, gateway 108 routes all incoming signals to a voice coder for the duration of the communication session at step 306. This may include, for example, a TTY detector 206 routing all of the incoming signals to voice coder 208. This may also include voice coder 208 encoding the incoming signals for transmission over network 106 or decoding the incoming signals for transmission to one or more voice devices 102.

If TTY detection is enabled, gateway 108 monitors the incoming signals for TTY information at step 308. This may include, for example, TTY detector 206a determining whether the frequency pattern of a portion or all of the incoming signals matches the pattern of voice signals or TTY signals. This may also include TTY detector 206b determining whether a packet containing information was receiving in-band or out-of-band. Gateway 108 determines whether TTY information has been detected at step 310. This may include, for example, TTY detector 206a detecting signals having a frequency pattern resembling TTY signals. This may also include TTY detector 206b receiving out-of-band packets.

If TTY information is not detected, gateway 108 routes the incoming signals to a voice coder at step 312. This may include, for example, TTY detector 206 communicating the incoming signals to voice coder 208. Otherwise, TTY information is detected. If the incoming signals are received over PSTN interface 202, gateway 108 separates the TTY signals from any voice signals at step 314. This may include, for example, TTY detector 206a identifying any TTY signals in the incoming signals. This may also include TTY detector 206a performing subtractive synthesis to remove the TTY signals from the incoming signals. The remaining incoming signals represent voice information. In one embodiment, gateway 108 need not separate voice and TTY information when the incoming signals are received over network interface 204 because the voice information and TTY information are already separated into in-band and out-of-band packets. Gateway 108 routes any voice signals to the voice coder 208 at step 316, and gateway 108 routes the TTY signals to the TTY coder 210 at step 318. The voice coder 208 could then code any voice information in the incoming signals, and the TTY coder 210 could code any TTY information in the incoming signals.

Gateway 108 determines whether the communication session has been completed at step 320. This may include, for example, gateway 108 determining whether a telephone call has been terminated by at least one of the parties when two parties are involved in the call. The call could also involve more than two parties, such as when multiple conferenced parties appear at a single PSTN interface 202 of gateway 108. In that case, as long as one of the conferenced parties remains involved in the call, gateway 108 may determine that the call has not been completed. If the communication session has not completed, gateway 108 returns to step 302 to receive additional incoming signals. Otherwise, method 300 ends.

Although FIG. 3 illustrates one example of a method 300 for communicating text teletype information in a communication network, various changes may be made to FIG. 3. For example, instead of or in addition to determining whether TTY detection has been enabled at step 304, gateway 108 could also determine whether voice detection has been enabled. In addition, gateway 108 may not be able to enable or disable TTY detection, and steps 304–306 may not be required.

FIG. 4 illustrates an example method 400 for negotiation between gateways in a communication network. While method 400 may be described with respect to gateway 108 of FIG. 2 operating in the system 100 of FIG. 1, method 400 could be used by any suitable gateway operating in any suitable system.

A transmitting gateway 108 receives TTY information from one or more TTY devices 104 at step 402. This may include, for example, the transmitting gateway 108 receiving the TTY signals over PSTN interface 202. This may also include the transmitting gateway 108 identifying a start signal in the TTY signals.

The transmitting gateway 108 identifies the encoding scheme or schemes available for use at the transmitting gateway 108. This may include, for example, a TTY negotiator 220 in the transmitting gateway 108 identifying the various TTY encoders 216 available for use in gateway 108. The transmitting gateway 108 identifies the destination gateway 108 at step 406. This may include, for example, gateway 108 using the dialed telephone number associated with the communication session to identify the destination gateway 108. The transmitting gateway 108 determines whether the destination gateway 108 supports the identified encoding scheme at step 408. This may include, for example, the TTY negotiator 220 in the transmitting gateway 108 communicating directly with a TTY negotiator 220 in the destination gateway 108 to identify the encoding scheme or schemes supported by the destination gateway 108. This could also include the TTY negotiator 220 in the transmitting gateway 108 accessing a table 224 identifying the various encoding scheme or schemes supported by different gateways 108 in system 100.

If the destination gateway 108 supports the identified encoding scheme, method 400 ends. Both gateways 108 can communicate and properly process the TTY information. Otherwise, the transmitting gateway 108 identifies one or more intermediate TTY translators 116 at step 410. This may include, for example, TTY negotiator 220 in the transmitting gateway 108 accessing a table 226 identifying the various encoding schemes supported by different intermediate TTY translators 116 in system 100. This may also include the TTY negotiator 220 determining whether one or a series of intermediate TTY translators 116 support the encoding schemes used by the transmitting and destination gateways 108.

The transmitting gateway 108 communicates the TTY information to the identified intermediate TTY translator or translators 116 at step 412. This may include, for example, the transmitting gateway 108 transmitting packets containing the TTY signals to the identified intermediate TTY translator 116. The intermediate TTY translator 116 can receive the packets, decode the TTY information using the encoding scheme supported by the transmitting gateway 108, encode the TTY information using an encoding scheme supported by the destination gateway 108, and communicate the TTY information to the destination gateway 108.

Although FIG. 4 illustrates one example of a method 400 for negotiation between gateways in a communication network, various changes may be made to FIG. 4. For example, the transmitting gateway 108 could identify the destination of the TTY signals before identifying the encoding scheme. Also, one or both of the gateways 108 could generate an error when the gateways 108 do not support a common encoding scheme and a suitable TTY translator 116 cannot be located.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving a signal;
   determining whether the signal includes text teletype information;
   separating the text teletype information from the signal;
   coding the text teletype information using a text teletype coder; and
   transmitting the coded text teletype information out-of-band, separate from the signal.

2. The method of claim 1, wherein:
   the signal is received from at least one of a voice device and a text teletype device from a Public Switched Telephone Network.

3. The method of claim 2, wherein determining whether the signal includes text teletype information comprises determining whether a start signal from the text teletype device is present in the signal.

4. The method of claim 1, further comprising:
   identifying a gateway associated with a destination of the text teletype information;
   determining whether the gateway supports a first encoding scheme;
   identifying one or more text teletype translators that support the first encoding scheme and a second encoding scheme used by the text teletype encoder; and
   communicating the text teletype information to at least one of the one or more identified text teletype translators for delivery to the gateway.

5. The method of claim 2, wherein the voice device comprises a telephone.

6. The method of claim 1, wherein:
   the signal is received in a plurality of packets.

7. The method of claim 6, wherein determining whether the signal includes text teletype information comprises identifying in-band packets as containing voice information and out-of-band packets as containing text teletype information.

8. The method of claim 7, further comprising depacketizing the packets.

9. The method of claim 1, further comprising determining whether a text teletype detection feature has been enabled;
wherein determining whether the signal includes text teletype information comprises determining whether the signal includes text teletype information when the text teletype detection feature has been enabled; and
wherein the text teletype information is coded only when the text teletype detection feature has been enabled.

10. The method of claim 1, wherein the signal comprises only text teletype information.

11. Logic embodied on at least one computer readable medium and operable when executed to:
receive a signal;
determine whether the signal includes text teletype information;
separate the text teletype information from the signal;
communicate the text teletype information to a text teletype coder; and
transmit the coded text teletype information out-of-band, separate from the signal.

12. The logic of claim 11, wherein:
the logic is operable to receive the signals from at least one of a voice device and a text teletype device.

13. The logic of claim 12, wherein the logic is operable to determine whether the signal includes text teletype information by determining whether a start signal from the text teletype device is present in the signal.

14. The logic of claim 11, wherein the logic is further operable to:
identifying a gateway associated with a destination of the text teletype information;
determining whether the gateway supports a first encoding scheme;
identify one or more text teletype translators that support the first encoding scheme and a second encoding scheme used by the text teletype encoder; and
communicate the text teletype information to at least one of the one or more identified text teletype translators for delivery to the gateway.

15. The logic of claim 11, wherein:
the logic is operable to receive the signal in a plurality of packets; and
the logic is operable to communicate the text teletype information to a text teletype decoder.

16. The logic of claim 15, wherein the logic is operable to determine whether the signal includes text teletype information by identifying in-band packets as containing voice information and out-of-band packets as containing text teletype information.

17. The logic of claim 11, wherein:
the logic is further operable to determine whether a text teletype detection feature has been enabled;
the logic is operable to determine whether the signal includes text teletype information when the text teletype detection feature has been enabled; and
the logic is operable to communicate the text teletype information when the text teletype detection feature has been enabled.

18. A system, comprising:
a first interface operable to receive a signal;
a text teletype detector operable to determine whether the signal includes text teletype information, the text teletype detector also operable to communicate the text teletype information to a text teletype coder;
the text teletype coder is operable to code the text teletype information using an encoding scheme;
a second interface operable to transmit the coded text teletype information out-of-band, separate from the signal; and
a text teletype negotiator operable to identify a gateway associated with a destination of the coded text teletype information and to determine whether the gateway supports the encoding scheme.

19. The system of claim 18, wherein:
the interface is operable to communicate with at least one of a voice device and a text teletype device; and
the text teletype detector is operable to determine whether the signal includes text teletype information by determining whether a start signal from the text teletype device is present in the signal.

20. The system of claim 18, wherein the text teletype negotiator is further operable to:
identify one or more text teletype translators that support both the encoding scheme used by the text teletype encoder and the encoding scheme used by the gateway; and
communicate the text teletype information to at least one of the one or more identified text teletype translators for delivery to the gateway.

21. The system of claim 18, wherein the interface is operable to communicate over a network and receive one or more packets containing the signal; and
the text teletype detector is operable to determine whether the signal includes text teletype information by identifying in-band packets as containing voice information and out-of-band packets as containing text teletype information.

22. The system of claim 18, wherein:
the interface comprises a first interface operable to communicate with at least one of a voice device and a text teletype device;
the text teletype detector comprises a first text teletype detector coupled to the first interface; and
further comprising:
a second interface operable to communicate over a network;
a second text teletype detector coupled to the second interface.

23. A method, comprising:
receiving signals comprising text teletype information;
encoding the text teletype information using a text teletype encoding scheme;
identifying a destination associated with the coded text teletype information;
determining whether a gateway associated with the destination supports the text teletype encoding scheme;
communicating the coded text teletype information to the gateway when the gateway supports the text teletype encoding scheme, wherein the text teletype encoding scheme comprises a first text teletype encoding scheme;
identifying a second text teletype encoding scheme supported by the gateway;
identifying one or more text teletype translators that support both the first and second text teletype encoding schemes; and communicating the coded text teletype information to at least one of the one or more identified text teletype translators for delivery to the gateway when the gateway does not support the first text teletype encoding scheme.

24. The method of claim 23, wherein identifying the second text teletype encoding scheme comprises receiving information identifying the second text teletype encoding scheme from the gateway.

25. The method of claim 23, wherein identifying the second text teletype encoding scheme comprises accessing a table, the table indicating that the gateway supports the second text teletype encoding scheme.

26. Logic encoded on at least one computer readable medium and operable when executed to:
receive signals comprising text teletype information;
encode the text teletype information using a text teletype encoding scheme;
identify a destination associated with the text teletype information;
determine whether a gateway associated with the destination supports the text teletype encoding scheme;
communicate the text teletype information to the gateway when the gateway supports the text teletype encoding scheme, wherein the text teletype encoding scheme comprises a first text teletype encoding scheme;
identify a second text teletype encoding scheme supported by the gateway;
identify one or more text teletype translators that support both the first and second text teletype encoding schemes; and
communicate the text teletype information to at least one of the one or more identified text teletype translators for delivery to the gateway when the gateway does not support the first text teletype encoding scheme.

27. The logic of claim 26, wherein the logic is operable to identify the second text teletype encoding scheme by receiving information identifying the second text teletype encoding scheme from the gateway.

28. The logic of claim 26, wherein the logic is operable to identify the second text teletype encoding scheme by accessing a table, the table indicating that the gateway supports the second text teletype encoding scheme.

29. A system, comprising:
a memory operable to store a table identifying one or more text teletype encoding schemes supported by each of one or more gateways; and
one or more processors collectively operable to:
receive signals comprising text teletype information;
encode the text teletype information using one of the one or more text teletype encoding schemes;
identify a destination associated with the coded text teletype information;
determine whether the gateway associated with the destination supports the text teletype encoding scheme used to encode the coded text teletype information;
communicate the coded text teletype information to the gateway when the gateway supports the text teletype encoding scheme used to encode the text teletype information, wherein the text teletype encoding scheme used to encode the text teletype information comprises a first text teletype encoding scheme;
identify a second text teletype encoding scheme supported by the gateway using the table;
identify one or more text teletype translators that support both the first and second text teletype encoding schemes; and
communicate the coded text teletype information to at least one of the one or more identified text teletype translators for delivery to the gateway when the gateway does not support the first text teletype encoding scheme.

30. The system of claim 29, wherein the memory is further operable to store a second table identifying one or more encoding schemes supported by each of a plurality of text teletype translators; and
the one or more processors are collectively operable to identify the one or more text teletype translators using the second table.

31. A method, comprising:
receiving signals comprising at least one of voice information and text teletype information;
determining whether at least some of the signals contain text teletype information;
coding any of the signals containing text teletype information using a text teletype coder;
coding any of the signals containing voice information using a voice coder;
identifying a destination associated with the coded text teletype information;
determining whether a gateway associated with the destination supports a text teletype encoding scheme used by the text teletype coder;
communicating the coded text teletype information to the gateway when the gateway supports the text teletype encoding scheme used by the text teletype coder; and
communicating the coded text teletype information to one or more text teletype translators for delivery to the gateway when the gateway does not support the text teletype encoding scheme used by the text teletype coder, the one or more text teletype translators supporting both the encoding scheme used by the text teletype coder and an encoding scheme used by the gateway.

32. A system, comprising:
means for receiving a signal;
means for determining whether the signal includes text teletype information;
means for separating the text teletype information from the signal;
means for coding the text teletype information using a text teletype encoding scheme; and
means for transmitting the coded text teletype information out-of-band, separate from the signal.

* * * * *